(12) United States Patent
Stefanik et al.

(10) Patent No.: US 11,272,500 B2
(45) Date of Patent: Mar. 8, 2022

(54) UNIFIED FACILITY COMMUNICATIONS SYSTEM WITH DEVICE LOCATION

(71) Applicant: Andrew Wireless Systems GmbH, Buchdorf (DE)

(72) Inventors: Joerg Stefanik, Donauworth (DE); Andreas Biehler, Kaisheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 183 days.

(21) Appl. No.: 16/572,963

(22) Filed: Sep. 17, 2019

(65) Prior Publication Data
US 2020/0100246 A1 Mar. 26, 2020

Related U.S. Application Data

(60) Provisional application No. 62/733,885, filed on Sep. 20, 2018.

(51) Int. Cl.
*H04W 72/04* (2009.01)
*H04B 7/06* (2006.01)
(Continued)

(52) U.S. Cl.
CPC ...... *H04W 72/0433* (2013.01); *H04B 7/0684* (2013.01); *H04W 64/003* (2013.01);
(Continued)

(58) Field of Classification Search
CPC ........... H04W 72/0433; H04W 64/003; H04W 64/006; H04W 72/0413; H04W 72/042;
(Continued)

(56) References Cited

U.S. PATENT DOCUMENTS

| 2013/0049930 A1 | 2/2013 | Wang |
| 2016/0029339 A1* | 1/2016 | Sauer ................. H04W 4/021 |
| | | 455/456.5 |
| 2017/0019144 A1 | 1/2017 | Malach |

FOREIGN PATENT DOCUMENTS

| KR | 20170101657 A * | 9/2017 |
| KR | 20170101657 A | 9/2017 |

OTHER PUBLICATIONS

International Searching Authority, "International Search Report and Written Opinion from PCT Application No. PCT/EP2019/075213", from Foreign Counterpart to U.S. Appl. No. 16/572,963, dated Nov. 25, 2019, pp. 1-22, Published: WO.

\* cited by examiner

*Primary Examiner* — Chi H Pham
*Assistant Examiner* — Ji-Hae Yea
(74) *Attorney, Agent, or Firm* — Fogg & Powers LLC (57) ABSTRACT

Systems and methods for unified facility communications systems with device location are provided. One system embodiment comprises: a master unit and a plurality of remote antenna units defining a DAS. The master unit communicates with a base station to receive a base station downlink RF signal and to transmit a base station uplink RF signal. The remote antenna units radiate a remote downlink RF signal into a coverage area and receive a remote uplink RF signal from the coverage area. The master unit comprises uplink and downlink circuitry to transport user device communications, and a facility supervisory module to process facility device traffic associated with wireless facility assets in the coverage area. Facility device traffic is transported via the remote antenna units. Within the master unit, user device communications is routed via the uplink and downlink circuitry and facility device traffic is routed via the facility supervisory module.

25 Claims, 6 Drawing Sheets

(51) Int. Cl.
*H04W 64/00* (2009.01)
*H04W 72/12* (2009.01)

(52) U.S. Cl.
CPC ....... *H04W 64/006* (2013.01); *H04W 72/042* (2013.01); *H04W 72/0413* (2013.01); *H04W 72/1284* (2013.01); *H04W 72/1289* (2013.01)

(58) Field of Classification Search
CPC .......... H04W 72/1284; H04W 72/1289; H04B 7/0684
See application file for complete search history.

UNIFIED FACILITY COMMUNICATIONS SYSTEM WITH DEVICE LOCATION

CROSS-REFERENCE TO RELATED APPLICATIONS

This U.S. patent application claims priority to, and the benefit of, U.S. Provisional Patent Application No. 62/733,885, titled "UNIFIED FACILITY COMMUNICATIONS SYSTEM WITH DEVICE LOCATION" and filed on Sep. 20, 2018, which is hereby incorporated by reference in its entirety.

BACKGROUND

A distributed antenna system (DAS) typically includes at least one master unit that is communicatively coupled with a plurality of remote antenna units. Each remote antenna unit can be coupled directly to the master unit or indirectly via one or more other remote antenna units and/or via one or more intermediary or expansion units. A DAS is typically used to improve the coverage provided by one or more base stations that are coupled to the master unit. These base stations can be coupled to the master unit via one or more cables or via a wireless connection, for example, using one or more donor antennas. In some implementations, a DAS may comprise more than one such master unit, for example to address redundancy concerns. The wireless service provided by the base stations can included commercial cellular service and/or public safety wireless communications. The basic functionality is to provide voice and/or data services to end users. However, inside the same facility where a DAS is deployed, multiple additional independent communications systems may be deployed associated with operation, maintenance, security, and/or public safety functions, each of which must be separately installed and maintained, each of which collect and store data relevant to their particular functions, and each having their own separately accessed management interfaces.

SUMMARY

The embodiments of the present disclosure provide methods and systems for unified facility communications system with device location and will be understood by reading and studying the following specification.

In one embodiment, a system comprises: a master unit; and a plurality of remote antenna units coupled to the master unit, the master unit and the plurality of remote antenna units defining a distributed antenna system; wherein the master unit is configured to communicatively couple to at least one wireless network base station, wherein the master unit is configured to receive a base station downlink radio frequency signal and to transmit a base station uplink radio frequency signal; wherein the remote antenna units are each configured to radiate a remote downlink radio frequency signal into a coverage area within a facility, the remote antenna unit further configured to receive a remote uplink radio frequency signal from the coverage area; wherein the master unit comprises uplink and downlink circuitry configured to transport user device communications between the at least one wireless network base station and at least one mobile device unit in the coverage area via the plurality of remote antenna units; wherein the master unit comprises a facility supervisory module, configured to process facility device traffic associated with a plurality of wireless facility assets in the coverage area, wherein the facility device traffic are transported via the plurality of remote antenna units; wherein within the master unit, user device communications is routed via the uplink and downlink circuitry and facility device traffic is routed via the facility supervisory module.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

As described herein, embodiments of the present disclosure provide a unitary point of access to various forms of communications traffic, so that facility operators and public safety personnel may leverage data from a diverse set of sensors and device within a facility while relating that information to the occupancy by people within the facility as gauged by the presence and location of mobile user devices. For example, the same communications infrastructure that supports wireless connectivity to users within the facility may be used to supervise building environmental conditions and equipment operations.

Figure 1:
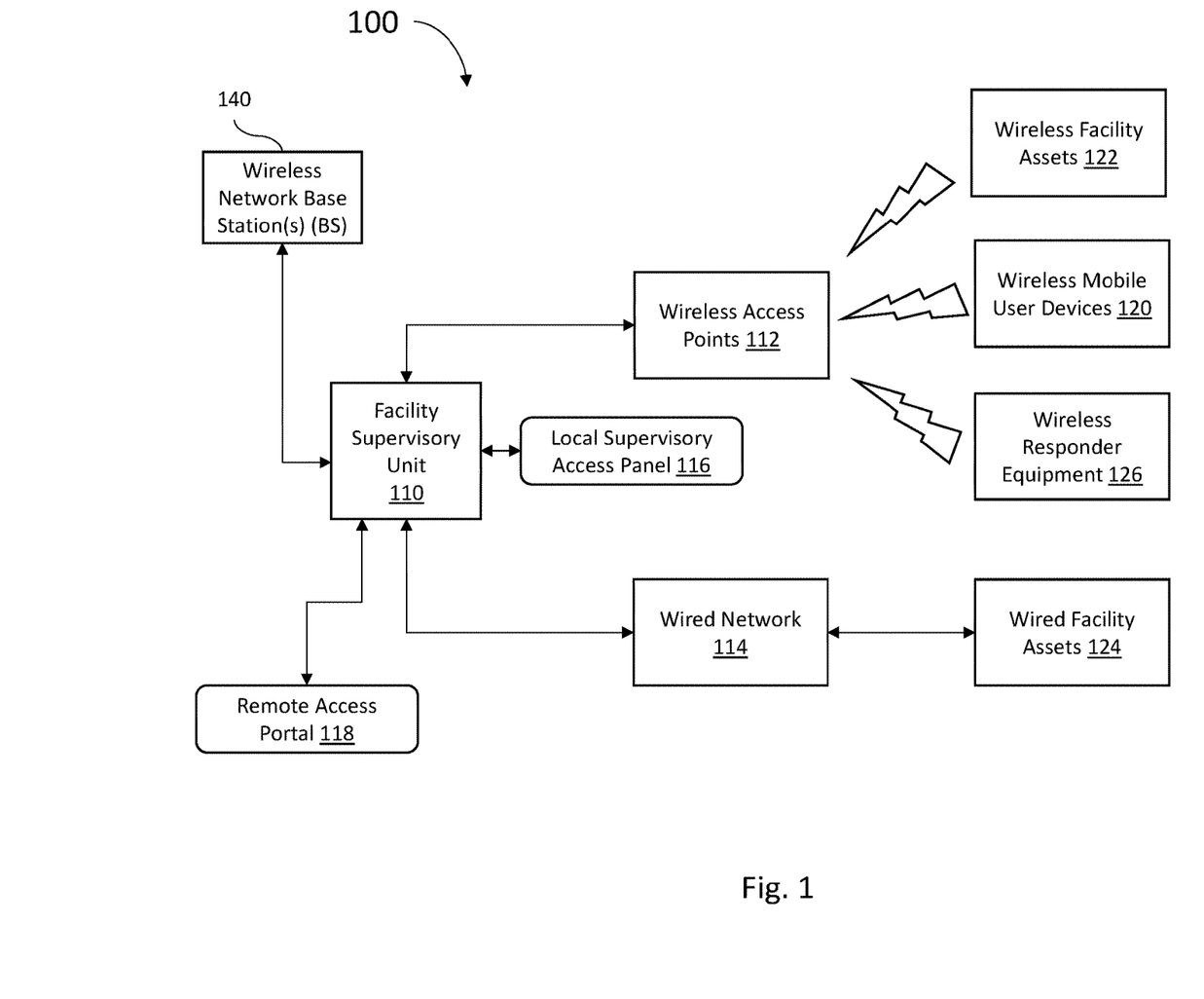
FIG. 1 is a block diagram illustrating one embodiment of a unified facility communication system.

FIG. 1 is a block diagram illustrating a unified facility communications system 100 of one embodiment of the present disclosure. It should be understood that the term "facility communications system" as used herein refers to a system that provides a comprehensive communications infrastructure, including wireless telecommunication services, to a facility such as a building, plant, campus, transportation hub, tunnel, theater, sports arena, parking lots or parking facilities, or any other type of facility. System 100 comprises at least one facility supervisory unit 110 communicatively coupled to a plurality of wireless access points 112 that may be wirelessly coupled to communications devices such as wireless mobile user devices 120 and wireless facility assets 122. In some embodiments, the facility supervisory unit 110 is further coupled via a wired network 114 (such as an Ethernet local access network (LAN)) to one or more wired facility assets 124. Mobile user devices 120 may comprise user equipment (UE) such as, but not limited to, cellular phones, laptop computer devices, wearable computing devices or tablet devices, which may be carried by, or otherwise associated with, people present within the facility, such as facility staff, contractors, vendors, visitors and guests, or any other person who might occupy the building for any purpose. For such mobile user devices 120, the facility communications system 100 provides connectivity between the mobile user devices 120 and one or more wireless network base stations 140, as described in greater detail below.

Wireless facility assets 122 and wired facility assets 124 comprise devices, such as but not limited to sensors, controllers, and/or gateways, used for monitoring and/or controlling facility operation, such as, but not limited to fire detectors, sprinklers, smoke detectors, locking systems, surveillance cameras, TVs, heating systems, trash management, lighting systems, motion and presence detectors or any form of internet of things (IoT) nodes (including without limitation IoT sensor nodes, IoT controller nodes, IoT gateways, and hybrid IoT nodes combining one or more of IoT sensor functions, IoT controller functions, and IoT gateway functions). For such facility assets devices, the facility communications system 100 provides various facility supervisory functionalities that utilize data collected from the facility assets for monitoring various aspects of the facility's operations and/or condition, and in some cases, to operate facility equipment, as described in greater detail below.

In some embodiments, wireless facility assets 122 may comprise, or otherwise be installed on, mobile platforms that travel around the facility. For example, wireless facility assets 122 may comprise vehicles such as trams, transports, shuttle busses, scooters, bicycles, that may travel to various locations within and/or across the facility, whether under human control or autonomously or semi-autonomously. In some embodiments wireless facility assets 122 may comprise robots, including flying drones, that operate under human control or autonomously or semi-autonomously. In such embodiments, the vehicles and/or robots that incorporate wireless facility assets 122 may be operational or maintenance equipment used in the day-to-day operation of the facility. Command and control messages may be communicated to these vehicles and robots via the facility communications system 100. Moreover, sensor measurements, of vehicle and/or robot operating parameters, or measurements of local environmental parameters, or one-way or two-way audio and/or video, may be communicated with these vehicles and robots via the facility communications system 100. In other embodiments, such vehicle and/or robots may instead operate as responder equipment 126 introduced to the facility by police or emergency responders to address an event.

In some embodiments, access to the facility supervisory functionalities may be obtained by building management, maintenance, and security personnel, and other authority or agencies such as police or emergency responders. Access may be obtained, for example, through one or more local supervisory access panels 116, or through an access portal (such a web page server) via a remote terminal 118 configured to connect to the facility supervisory unit 110. In some embodiments, the facility communications system 100 further communicates with emergency responder equipment 126 via plurality of wireless access points 112 to provide information and guidance to responders during emergency or security events.

Accordingly, the facility communications system 100 described herein consolidates functionality previously spread across several communication systems, into a single system that further leverages benefits of communicating with a diversity of different devices to provide features not previously available.

Figure 2:
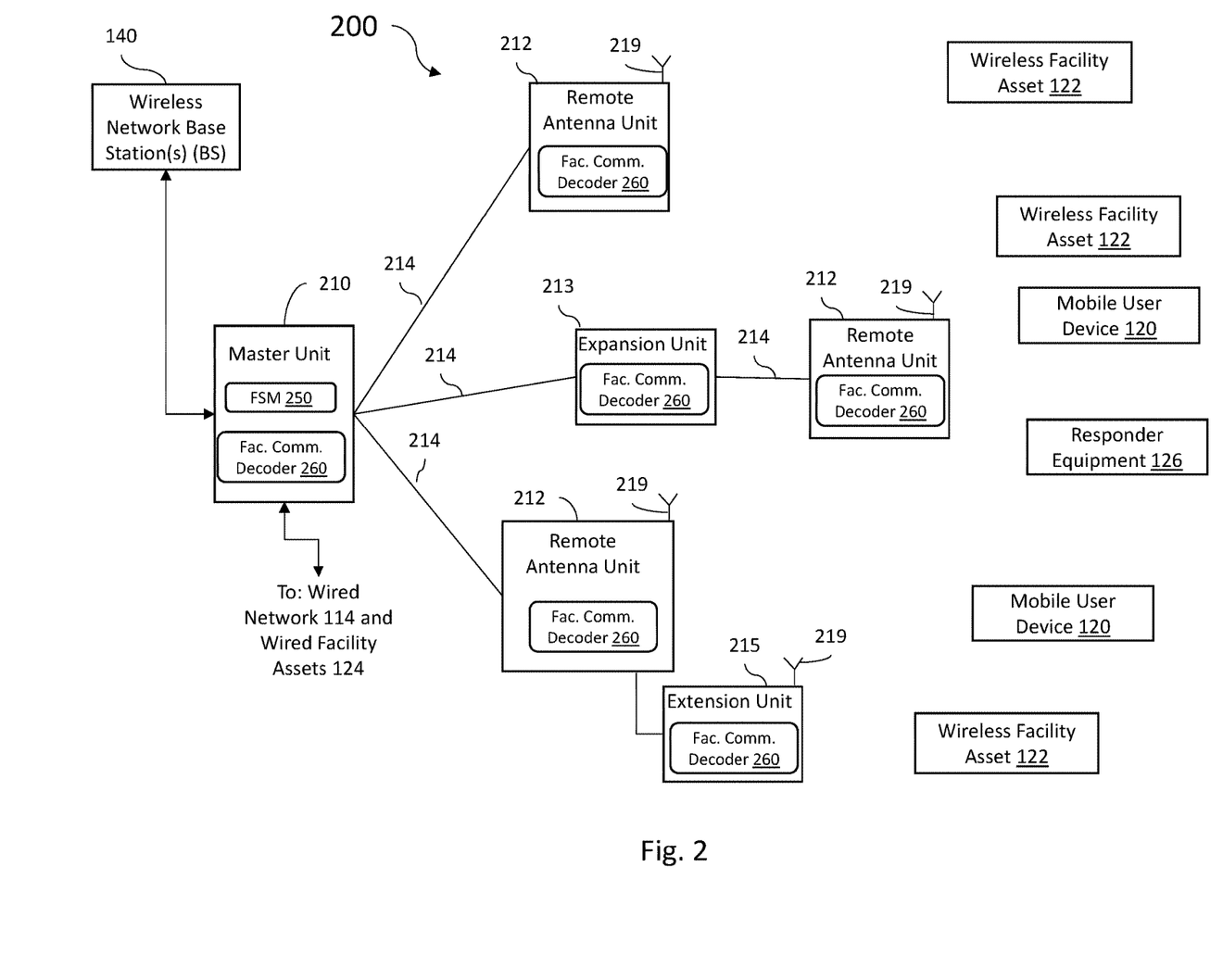
FIG. 2 is a block diagram illustrating one embodiment of a unified facility communication system.

FIG. 2 is a block diagram illustrating an example implementation of the unified facility communications system 100, wherein communications between the facility supervisory unit 110 and the wireless mobile user devices 120 and wireless facility assets 122 is achieved using a distributed antenna System (DAS) 200 (also referred to herein as a DAS installation) of one embodiment of the present disclosure. In this embodiment, the DAS 200 comprises one or more master units 210, one of which operates as the facility supervisory unit 110 illustrated in FIG. 1. DAS 200 comprises one or more remote antenna units 212 that operate as the plurality of wireless access points 112 illustrated in FIG. 1. The one or more master units 210 are communicatively coupled to the one or more remote antenna units 212 via one or more communication links 214.

In various different embodiments, the communication links 214 may comprise wireless communication links, cables (i.e. wired communication links), or some combination thereof. As used herein, the term cable is used generically and may refer to either electrical or fiber optic cables, or hybrid cables comprising both electrical conductors and optical fibers. It should be understood that DAS 200 may provide wireless telecommunication services to a building, plant, campus, transportation hub, tunnel, or any other type of facility. In some embodiments, the communication links 214 discussed herein may each operate bidirectionally with downlink and uplink communications carried over the link. It should also be understood, however, that in other embodiments, a communication link 214 may itself further comprise a pair of links including, for example, an uplink cable for uplink communication, and a downlink cable for downlink communication.

Each remote antenna unit 212 can be communicatively coupled directly to one or more of the master units 210 or indirectly via one or more other remote antenna units 212 and/or via one or more intermediary or expansion units 213. In some embodiments, DAS 200 may further include one or more extension units 215 that are communicatively coupled to a remote antenna unit 212 to further extend coverage.

Each master unit 210 is communicatively coupled to one or more base stations 140 (such as the wireless network base stations 140 described in FIG. 1). In some embodiments, one or more of the base stations 140 can be co-located with the respective master units 210 to which it is coupled (for example, where the base station 140 is dedicated to providing base station capacity to the DAS 200 and is coupled to the respective master units 210). In other embodiments, the base station 140 is not co-located or in the same building as the master unit 210. That is, one or more of the base stations 140 can be located remotely from the respective master units 210 to which it is coupled (for example, where the base station 140 provides base station capacity to an area beyond the coverage area of the DAS 200). In this latter case, the master unit 210 can be coupled to a donor antenna and repeater or bi-directional amplifier in order to wirelessly communicate with the remotely located base station 140. In some embodiments, base station 140 can be coupled to an integration node that is coupled by optical fiber to a centralized master unit.

In an exemplary embodiment, the base stations 140 include one or more base stations that are used to provide public and/or private safety wireless services (for example, wireless communications used by emergency services organizations such as police, fire and emergency medical services) to prevent or respond to incidents that harm or endanger persons or property. Such base stations are also referred to here as "safety wireless service base stations" or "safety base stations." The base stations 140 also can include, in addition to safety base stations, one or more base stations that are used to provide commercial cellular wireless service. Such base stations are also referred to here as "commercial wireless service base stations" or "commercial base stations."

The base stations 140 can be coupled to the master units 210 using a network of attenuators, combiners, splitters, amplifiers, filters, cross-connects, etc., (sometimes referred to collectively as a "point-of-interface" or "POI"), and/or via one or more pick-up repeaters. This network can be included in the master units 210 and/or can be separate from the master units 210. This is done so that, in the downlink, the desired set of radio frequency (RF) channels output by the base stations 140 can be extracted, combined, and routed to the appropriate master units 210, and so that, in the upstream, the desired set of carriers output by the master units 210 can be extracted, combined, and routed to the appropriate interface of each base station 140. It is to be understood, however, that this is one example and that other embodiments can be implemented in other ways.

Figure 2A:
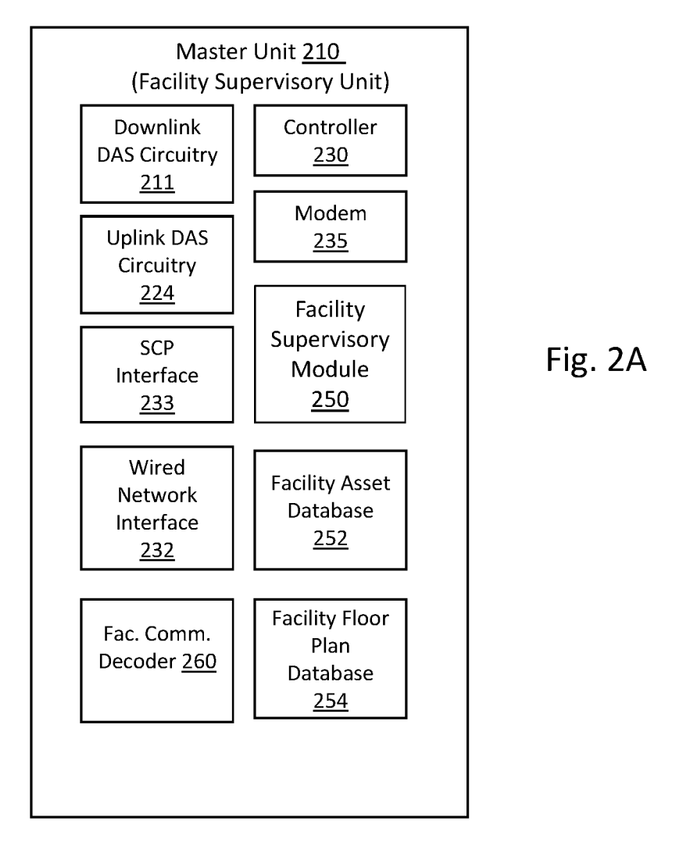
FIG. 2A is a diagram illustrating one embodiment of a master unit of a distributed antenna system (DAS) for a unified facility communication system.

As shown in FIG. 2A, in general, each master unit 210 comprises downlink DAS circuitry 211 that is configured to receive one or more downlink signals from one or more base stations 140. These signals are also referred to here as "base station downlink signals." Each base station downlink signal includes one or more radio frequency channels used for communicating in the downlink direction with mobile user devices 120 (such as tablets or cellular telephone, for example) over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The downlink DAS circuitry 211 in each master unit 210 is also configured to generate one or more downlink transport signals derived from one or more base station downlink signals and to transmit one or more downlink transport signals to one or more of the remote antenna units 212.

Figure 2B:
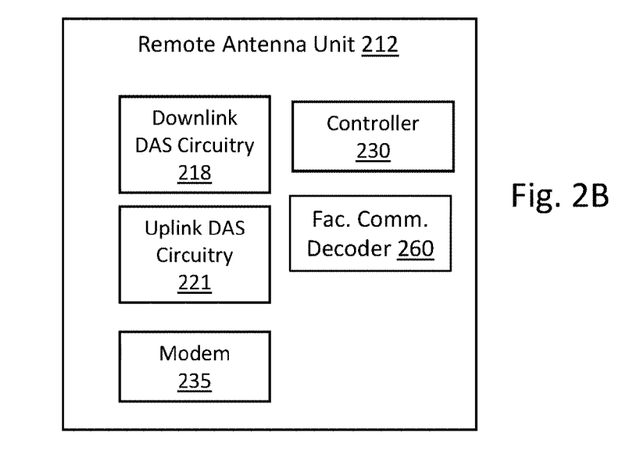
FIG. 2B is a diagram illustrating one embodiment of an access point/remote antenna unit for a unified facility communication system.

As shown in FIG. 2B, each remote antenna unit 212 comprises downlink DAS circuitry 218 that is configured to receive the downlink transport signals transmitted to it from one or more master units 210 and to use the received downlink transport signals to generate one or more downlink radio frequency signals that are radiated from one or more antennas 219 associated with that remote antenna unit 212 for reception by mobile user devices 120. These downlink radio frequency signals are analog radio frequency signals and are also referred to here as "remote downlink radio frequency signals." Each remote downlink radio frequency signal includes one or more of the downlink radio frequency channels used for communicating with mobile user devices 120 over the wireless air interface. In this way, the DAS 200 increases the coverage area for the downlink capacity provided by the base stations 140.

Also, each remote antenna unit 212 comprises uplink DAS circuitry 221 that is configured to receive via antenna(s) 219 one or more uplink radio frequency signals transmitted from the mobile user devices 120. These signals are analog radio frequency signals and are also referred to here as "remote uplink radio frequency signals." Each uplink radio frequency signal includes one or more radio frequency channels used for communicating in the uplink direction with mobile user devices 120 over the relevant wireless air interface. The uplink DAS circuitry 221 in each remote antenna unit 212 is also configured to generate one or more uplink transport signals derived from the one or more remote uplink radio frequency signals and to transmit one or more uplink transport signals to one or more of the master units 210.

Each master unit 210 comprises uplink DAS circuitry 224 that is configured to receive the respective uplink transport signals transmitted to it from one or more remote antenna units 212 and to use the received uplink transport signals to generate one or more base station uplink radio frequency signals that are provided to the one or more base stations 140 associated with that master unit 210. Typically, this involves, among other things, combining or summing uplink signals received from multiple remote antenna units 212 in order to produce the base station signal provided to each base station 140. Each base station uplink signal includes one or more of the uplink radio frequency channels used for communicating with mobile user devices 120 over the wireless air interface. In this way, the DAS 200 increases the coverage area for the uplink capacity provided by the base stations 140.

Figure 2C:
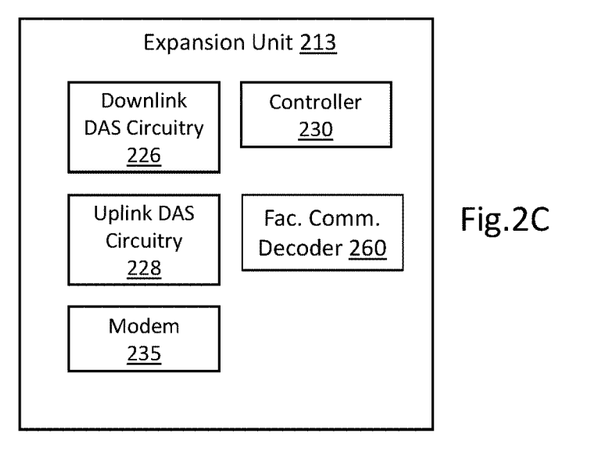
FIG. 2C is a diagram illustrating one embodiment of an expansion unit for a unified facility communication system.

As shown in FIG. 2C, each expansion unit 213 comprises downlink DAS circuitry 226 that is configured to receive the downlink transport signals transmitted to it from the master unit 210 (or other expansion unit 213) and transmits the downlink transport signals to one or more remote antenna units 212 or other downstream intermediary units 213. Each expansion unit 213 comprises uplink DAS circuitry 228 that is configured to receive the respective uplink transport signals transmitted to it from one or more remote antenna units 212 or other downstream intermediary units 213, combine or sum the received uplink transport signals, and transmit the combined uplink transport signals upstream to the master unit 210 or other expansion unit 213. In some embodiments, one or more remote antenna units 212 may be coupled to the one or more master units 210 via one or more other remote antenna units 212 (for examples, where the remote antenna units 212 are coupled together in a daisy chain or ring topology). In such embodiments, an expansion unit 213 may be implemented using a remote antenna units 212.

Figure 2D:
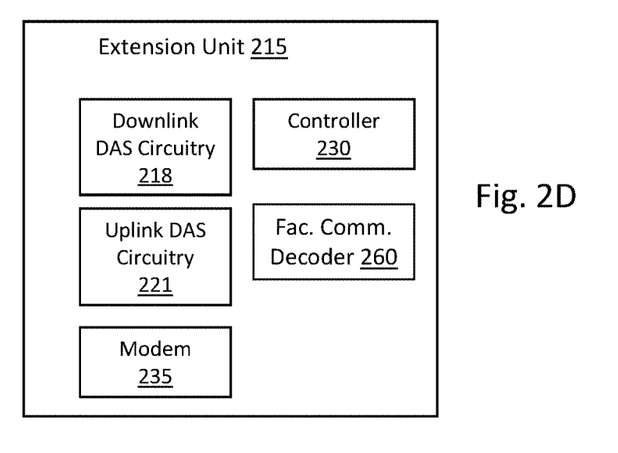
FIG. 2D is a diagram illustrating one embodiment of an extension unit for a unified facility communication system.

As shown in FIG. 2D, each extension unit 215 may in some embodiments comprises downlink DAS circuitry 218 that is configured to receive the downlink transport signals transmitted to it from a remote antenna unit 212 and to use the received downlink transport signals to generate one or more downlink radio frequency signals that are radiated from one or more antennas 219 associated with that extension unit 215 for reception by mobile user devices 120. Each downlink radio frequency signal includes one or more of the downlink radio frequency channels used for communicating with mobile user devices 120 over the wireless air interface. In this way, the DAS 200 may even further increase the coverage area for the downlink capacity provided by the base stations 140. Each extension unit 215 may further comprise uplink DAS circuitry 221 that is configured to receive via antenna(s) 219 one or more uplink radio frequency signals transmitted from the mobile user devices 120. These signals are analog radio frequency signals and are also referred to here as "uplink radio frequency signals." Each uplink radio frequency signal includes one or more radio frequency channels used for communicating in the uplink direction with mobile user devices 120 over the relevant wireless air interface. The uplink DAS circuitry 221 in each extension unit 215 may also be configured to generate one or more uplink transport signals derived from the one or more remote uplink radio frequency signals and to transmit one or more uplink transport signals to the remote antenna unit 212 to which it is coupled. In some embodiments, the uplink DAS circuitry 221 in a remote antenna unit 212 may be further configured to receive the respective uplink transport signals transmitted to it from an extension unit 215 and to use the received uplink transport signals to generate uplink radio frequency signals that are provided to the master unit 210.

The downlink DAS circuitry 211, 218, and 226 and uplink DAS circuitry 224, 221, and 228 in each master unit 210, remote antenna unit 212, expansion unit 213, and extension unit 215, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 211, 218, and 226 and uplink DAS circuitry 224, 221, and 228 may share common circuitry and/or components. For example, some components (such as duplexers) by their nature are shared among the downlink DAS circuitry 211, 218, and 226 and uplink DAS circuitry 224, 221, and 228.

The DAS 200 can use either digital transport, analog transport, or combinations of digital and analog transport for generating and communicating the transport signals between the master units 210, the remote antenna units 212, and any expansion units 213. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 210 and the remote antenna units 212), or combinations of analog and digital transport.

Each unit 210, 212, 213, 215 in the DAS 200 can also comprise a respective controller 230, which may be implemented using one or more programmable processors and memory hardware that execute software that is configured to implement the various features described here as being implemented by the controller 230. The controller 230, the various features described here as being implemented by the controller 230, or portions thereof, can be implemented in other ways (for example, in a field programmable gate array (FPGA), application specific integrated circuit (ASIC), etc.). Each controller 230 is configured to monitor and control the operation of the associated unit. Each controller 230 is also configured to send and receive management data over the DAS 200. In one embodiment, each unit 210, 212, 213, 215 in the DAS 200 also comprises a modem 235 that is configured to send and receive management data over the DAS 200 by modulating and demodulating one or more carrier frequencies that are used for the purpose of communicating management data. In some embodiments (for example, where digital transport is used in the DAS), a separate modem 235 for modulating and demodulating management data is not used and, instead, the management data is combined with the digital DAS transport data before being supplied to the transport transceiver or other physical layer device.

As shown in FIG. 2A, the master unit 210 further comprises a facility supervisory module 250, a facility communications decoder 260, and may further comprise one or both of a facility asset database 252 and a facility floor plan database 254 which are stored in a memory. The facility supervisory module 250 and facility communications decoder 260 may be executed by the controller 230 to implement the functions of the Facility Supervisory Unit described herein. The facility supervisory module 250 may access one or both of the facility asset database 252 and facility floor plan database 254 from a memory of the master unit 210, or a remotely accessed memory. Connectivity between the master unit 210 and the wired network 114 may be implemented by a wired network interface 232, which may comprise, for example, an Ethernet port.

The facility supervisory module 250 extends the functionality of DAS 200 to include detection and control of a multitude of different facility asset devices, eliminating the need for separate building maintenance, operations, fire detection and security communication networks. For example, communications facility assets 122 and 124 that comprise sensors and control devices associated with environmental controls (e.g., heating, cooling and ventilation), fire detection (e.g., smoke and heat detection and associated alarms), security (e.g., door and window alarms, motion or proximity detection), building operations and maintenance (e.g. lighting control, equipment status) and the like may be achieved over the same communications infrastructure that provides connectivity between mobile user devices 120 within the facility and wireless service provides (through base stations 140). The wireless facility assets 122 may communicate with the facility supervisory module 250 through radio frequency signals exchange with the various remote antenna units 212. Such communications are not limited to any one specific wireless protocol or technology, but may include, for example, 2G, 3G, 4G, 5G or LTE cellular communications protocols, IEEE 802.11 protocols (e.g., Wi-Fi), IEEE 802.15 protocols (e.g., Bluetooth, ZigBee), IEEE 802.16 protocols (e.g. WiMAX) or other technologies. In order to discern mobile user device 120 communications traffic (which will be referred to herein as "user device communications" or "user device traffic") from wireless facility asset 122 communications traffic (which will be referred to herein as "facility device communications" or "facility device traffic"), facility communications decoder 260 monitors the uplink communications traffic received at the master unit 210 from the one or more communication links 214. As such facility communications decoder 260 functions at least in part as a device identification decoder. In some embodiments, the facility communications decoder 260 may detect a device identification (device ID) code or other parameter or characteristic present within the packets or frames received from the remote antenna units 212 to separate user device communications from facility device communications. For example, device IDs for known installed facility asset devices 122 can be stored and accesses by the facility communications decoder 260 to readily identify traffic associated with facility asset devices. This example is not intended to be limiting as other techniques for distinguishing user device traffic from non-user device traffic may be used for this purpose.

Figure 2E:
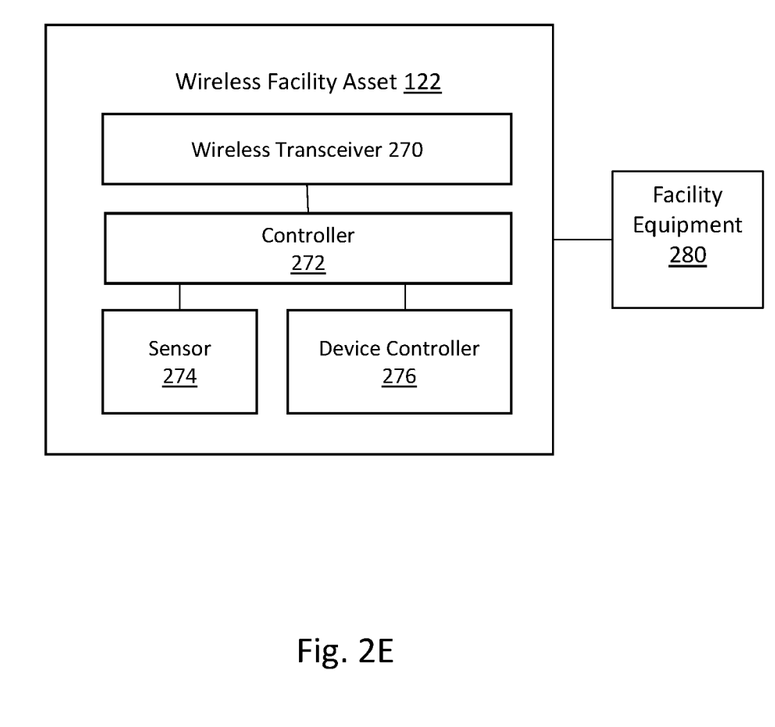
FIG. 2E is a diagram illustrating one embodiment of a wireless facility asset for a unified facility communication system.

FIG. 2E is a diagram illustrating an example wireless facility asset 122 of one embodiment of the present disclosure. Wireless facility asset 122 comprises a controller 272 coupled to a wireless transceiver 270, and may further comprise one or both of a sensor 274 and a device controller 276 (such as an electronic control unit, or a mechanical actuator). The device controller 276 may be used for controlling the operation of one or more units of facility equipment 280 based on equipment control commands received from the facility supervisory module 250. It is expressly intended that facility equipment 280 may encompass any form of electrical, electronic, or mechanical devices, such as, but not limited to window and door controls, lifts, air handlers, heating and cooling equipment, thermostats and other building environmental controls and lighting equipment, for example. Controller 270 may be implemented using one or more programmable processors and memory hardware that execute software that is configured to implement the various features described here as being implemented a wireless asset 122, including the collection of measurement data from sensor 274, or controlling building equipment through device controller 276. Each controller 272 is also configured to send and receive management data over the DAS 200 via wireless transceiver 270.

Communications received from the remote units 212 and identified as user device communications is routed to the uplink/downlink DAS circuitry 224/211 and processed as described above. Communications received from the remote antenna units 212 that is identified as facility device communications (non-user device traffic) is routed to the facility supervisory module 250. In some embodiments, one or more of the remote antenna units 212 may also comprise a facility communications decoder 260 executed by their local controller 230 to distinguish user device communications from facility device traffic. In some such embodiments, the remote antenna units 212 can send the identified facility device traffic to the facility supervisory module 250 via the DAS 200 on a management or control channel separate from channels used to transport user device traffic.

Given the architecture illustrated in FIGS. 1 and 2, localization of both wireless facility assets 122 and mobile user devices 120 within the facility can be achieved, for example, by recognizing that these devices are located within a coverage area of a certain remote antenna unit 212. With wired facility assets 124, these are fixed device such that the facility supervisory module 250 may already store information pertaining to the location of the device (such as by storing location information for such devices in the facility asset database 252). Using the infrastructure provided by DAS 200, embodiments of the present disclosure may further determine where wireless devices (whether facility assets 122 or user devices 120) are located within the facility. For example, given the multiple remote antenna units 212 distributed across the facility, the master unit 210 can determine which particular remote antenna unit 212 a given wireless device is connected to and from that information, the facility supervisory module 250 can infer that this wireless device is within a certain proximity of that particular remote antenna unit 212.

In some embodiments, the location of each remote antenna unit 212 can be stored in the facility asset database 252. When the facility supervisory module 250 determines that a wireless device is communicating with a given remote antenna unit 212, the facility supervisory module 250 may look up the location of that remote antenna unit 212 from the facility asset database 252, and associate a corresponding location to one or more wireless devices that are communicating through that remote antenna unit 212. The locations of these wireless devices determined in this manner may then also be stored in the facility asset database 252 so that the facility supervisory module 250 has ready access to location information for each wireless device in the facility that is connecting through the DAS 200. It should be appreciated that the resolution of location data will correspond to the size of the coverage cells within the facility established by the remote antenna unit 212. As the number of remote antenna unit 212 and the size of each coverage cell decreases accordingly, the resolution provided permits wireless device location with increasing precision. For example, with emerging wireless technologies such as 5G, higher frequency spectrums and the demand for higher bandwidth capacity and data rates, coverage cells implemented by remote antenna units 212 can be expected to become increasingly smaller as compared to legacy technologies, to the point where individual rooms of the facility may have their own access point provided by a remote antenna unit 212.

During emergency events, it can be critical for public safety and first responder personnel to be able to assess both the location and status of people within a facility, as well as the conditions that exist within the facility. The various embodiments of unified facility communications systems presented in this disclosure can not only provide first responders with access to such information, they enhance the available information through the synergy of having access to user device location information together with sensor measurement and location information. The master unit 210 may include a supervisory control panel interface 233 through which authorities may operate the supervisory control panel 116 to obtain access to the facility supervisory module 250, or through a remote terminal 118 configured to connect supervisory control panel interface 233.

For example, as discussed above, the facility supervisory module 250 can locate the position of people within the facility based on a sensed location of their mobile user device 120 within the context of DAS 200. In one embodiment, if an emergency call is made from a mobile user device 120, the facility supervisory module 250 detects both the occurrence of that call by monitoring uplink user traffic and the identification of the mobile user device 120 that made the call. The facility supervisory module 250 stores that information so that first responders can access the facility supervisory module 250 through a local supervisory access panel 116 to determine location information for the user device 210 that made the call. For example, the facility supervisory module 250 through the local supervisory access panel 116 may provide either the location of the mobile user device 120 when the call was made, the current location of the mobile user device 120 that made the call, and/or whether that mobile user device 120 is still detected as being active within the coverage area of the DAS 200. In some embodiments, the location of the mobile user device 120 is presented in context, such as displayed with an overlay of a building floor plan retrieved by the facility supervisory module 250 from the floor plan database 254 relevant to the proximity of the mobile user device 120. This can be a visual indication via floor plan or 3D building plan, where the position of the device can be marked and movement profiles of each device can be tracked. As such, in the case of an emergency, the system 100 can determine the number of user devices 210 (which would approximate the number of persons which potentially are in danger) within the building, and can send the building floor plan and detected user device 210 locations to the supervisory access panel 116, or other remote access portal, to guide the first responder directly to the people in danger. In an analogous manner, the facility supervisory module 250 can locate the position of sensors that are transmitting data or alarms indicative of adverse conditions. For example, where a wireless facility asset 122 comprises, for example, a smoke, heat, flame, poisonous gas, airborne particulate and/or radiation detector, the facility supervisory module 250 can initiate alarms when measurements from these sensors exceed a threshold, or when an alarm signal is directly generated by the sensor.

The location of the wireless facility asset 122, as well as the data from the device, is stored by the facility supervisory module 250 so that first responders can access the facility supervisory module 250 (for example, through the local supervisory access panel 116) to determine both the location of the emergency and the intensity of conditions in that area. The facility supervisory module 250 can present the location and measurement data in context, such as displayed with an overlay of a building floor plan retrieved by the facility supervisory module 250 from the floor plan database 254 relevant to the proximity of the sensors detecting the adverse conditions, to guide the first responder directly to the emergency spot. As such, by establishing communications with the wireless facility asset 122 through the DAS 200, the ability of the DAS 200 to dynamically determine the location of sensors, such as smoke/temperature/flame sensors for example, can be leveraged by first responders to identify hot areas within the facility to understand what is going on.

As discussed above, these sensors may in some embodiments comprise wireless facility asset 122 or responder equipment 126 that are deployed as vehicles, robots, drones, or the like under control and supervision via the facility supervisory module 250 via DAS 200. For example, an emergency first responder can send one or more robots or drones insides the facility first to better assess the situation (e.g. hazards, criminal or terrorists aspects) prior to sending in human responders.

Embodiments of the present disclosure provide the advantage of being able to simultaneously leverage both user device location, and sensor location and measurement data in order to provide responders with a complete understanding of the situation within the facility because its system can distinguish between the commercial mobile user devices 120, facility assets 122, and in some embodiments further distinguish first responder communications equipment 126. As such, the facility supervisory module 250 may present both the location of mobile user devices 120 together with their proximity to locations where adverse conditions have been detected by sensors in communication with the system 100. Moreover, the movement and/or expansion of the adverse conditions with respect to the location of mobile uses deices 120 and/or responder devices 126 can be readily ascertained. First responders may then concentrate and direct their personnel to protecting, assisting or rescuing those people under the most immediate threat from the adverse condition.

In some embodiments, the facility supervisory module 250 may transmit mission critical information through DAS 200 directly to responder equipment 126 instead of, or in addition to, a supervisory access panel 116. In some embodiments, responders carrying responder equipment 126 can exchange messages with those operating the supervisory access panel 116 via DAS 200. In various implementations, the responder equipment 126 may comprise, for example, handheld or wearable communications devices. For example, in some embodiments, the responder equipment 126 may comprise a communication device integrated within the safety equipment worn by a first responder, such as their helmet. In some embodiments, in addition to structural details and layouts, the floor plan database 254 and/or facility asset database 252 may include location information for safety equipment such as fire hoses, fire extinguishers, first aid kits, automated external defibrillators (AEDs), or other emergency equipment, making the location of such equipment known to first responders via the responder equipment 126 and/or supervisory access panel 116. In some embodiments, virtual or augmented reality displays may be implemented in responder equipment 126 so that responders may assess the position of people, trouble locations, and/or facility layouts and safety equipment from their perspective viewpoints. For example, if a first responder enters a room or area filled with smoke, the responder may refer to their responder equipment 126 which will display the relative position of detected user devices 120, hot spots, safety equipment, or facility features such as the closest escape routes or exits, as provided to the responder equipment by the facility supervisory module 250.

In some embodiments, the facility supervisory module 250 may similarly provide the same or similar information to the mobile user devices 120 to assist them in evacuating an area and/or avoiding locations with hazardous conditions. For example, the facility supervisory module 250 may correlated the location of mobile user devices 120 against the location of wireless or wired facility assets 122, 124 that are detecting hazardous conditions and send warnings to those mobile user devices 120 within a predetermined proximity of the wireless or wired facility assets 122, 124 that are detecting the hazardous conditions. For example, warnings or other emergency information may be communicated to mobile user device 120 sharing the cell as remote antenna unit 212 as the wireless facility assets 122, and within neighboring cells. Alternatively, the wired facility assets 122 detecting the hazardous conditions may be associated with a given floor of the facility, and mobile user devices 120 connecting to remote antenna unit 212 on that floor may be sent warnings or other emergency information. Depending on the type of emergency or conditions detected, the facility supervisory module 250 may actuate building alarms.

In some embodiments, the facility supervisory module 250 may correlate the location of wireless or wired facility assets 122, 124 detecting hazardous conditions with the location of mobile user devices 120 which may be affected by the hazardous conditions and send a graphical floorplan or directions to guide those endangered people out of the facility or hazardous area. For example, the facility supervisory module 250 may determine from the facility floor plan database 254 that for a floor of a building where smoke and fire have been detected several alternate fire escape stairways exist.

The facility supervisory module 250 may receive data from a smoke detector facility asset 122 within one of the fire escape stairways and based on that data, send directions to mobile user devices 120 on that floor to use the stairways that are still clear of smoke. In some embodiments, the facility supervisory module 250 may broadcast floorplans or other information over the DAS 200 showing the closest accessible escape routes. In other embodiments, the facility floor plan database 254 may include data on the location of dangerous or explosive materials and integrate this information into escape directions provided to user mobile user devices 120 or provided to first responders, via either the supervisory access panel 116 or responder equipment 126 for a risk assessment/management and to assist first responder in determining the right mission tactics for the particular emergency event. In some embodiments, the facility supervisory module 250 can receive status updates and other data from responder equipment 126 such as the status of respiratory protection equipment, oxygen fill levels, gas analyzer measurement data, images captured by first responder cameras, and the like, and report this information to the authorities managing the first responders.

The facility supervisory module 250 may automatically send updates and the newest information as additional information from sensors is received. In some embodiments, the facility supervisory module 250 may send commands to applications executing of the mobile user devices 120 to activate different functions of the mobile user devices 120 to assist in localization, for example by instructing the mobile user devices 120 to emit optical or acoustical signals (which may be observed by nearby first responders) or by activating hands-free speaking.

In other embodiments, the unified facility communications system 100 receives data from sensors via DAS 200 related to the security of the facility, such as motion detection, and opening and closing of doors and windows.

In some embodiments, by tracking which remote antenna unit 212 a wireless facility assets 122 or mobile user device 120 is communicating through, geo-fencing may be implemented to establish a perimeter around selected people or objects to determine when they have exited from authorized areas of the facility, or entered areas of the facility where they are not authorized. When such events are detected, the facility supervisory module 250 may active alarms, and/or send communications to on-site or off-site facility security or management personnel. Offsite security monitoring services may utilize the remote portal 118 to communicate with the facility supervisory module 250 to receive detected security events, or for general surveillance. In some embodiments, the facility supervisory module 250 and DAS 200 can recognize when someone enters the facility from the presence of previously undetected mobile user devices 120, and automatically send information to the mobile user device 120. In public safety context, this could be a plan with emergency exits or others, as described above. In other embodiments, it could be a floor plan of a shopping mall, advertising operating hours for retail businesses in the facility, or other relevant information.

In other embodiment, the unified facility communications system 100 may be used to monitor and manage routine building operating and maintenance tasks. For example, one or more wireless facility assets 120 may measure the fill level of trash cans or similar receptacles and autonomously inform maintenance staff to send a member to empty the receptacle. In some embodiments, other facility utilization statistics may be compiled by the facility supervisory module 250 from data collected from DAS 200 connector sensors, for example, to optimize the energy needs of the facility, by using motion and presence detectors to implement power management policies (such as for heating and lighting). The facility supervisory module 250, using such information, can build a utilization model of rooms, based on presence profiles of people and control heating and lighting accordingly.

Figure 3:
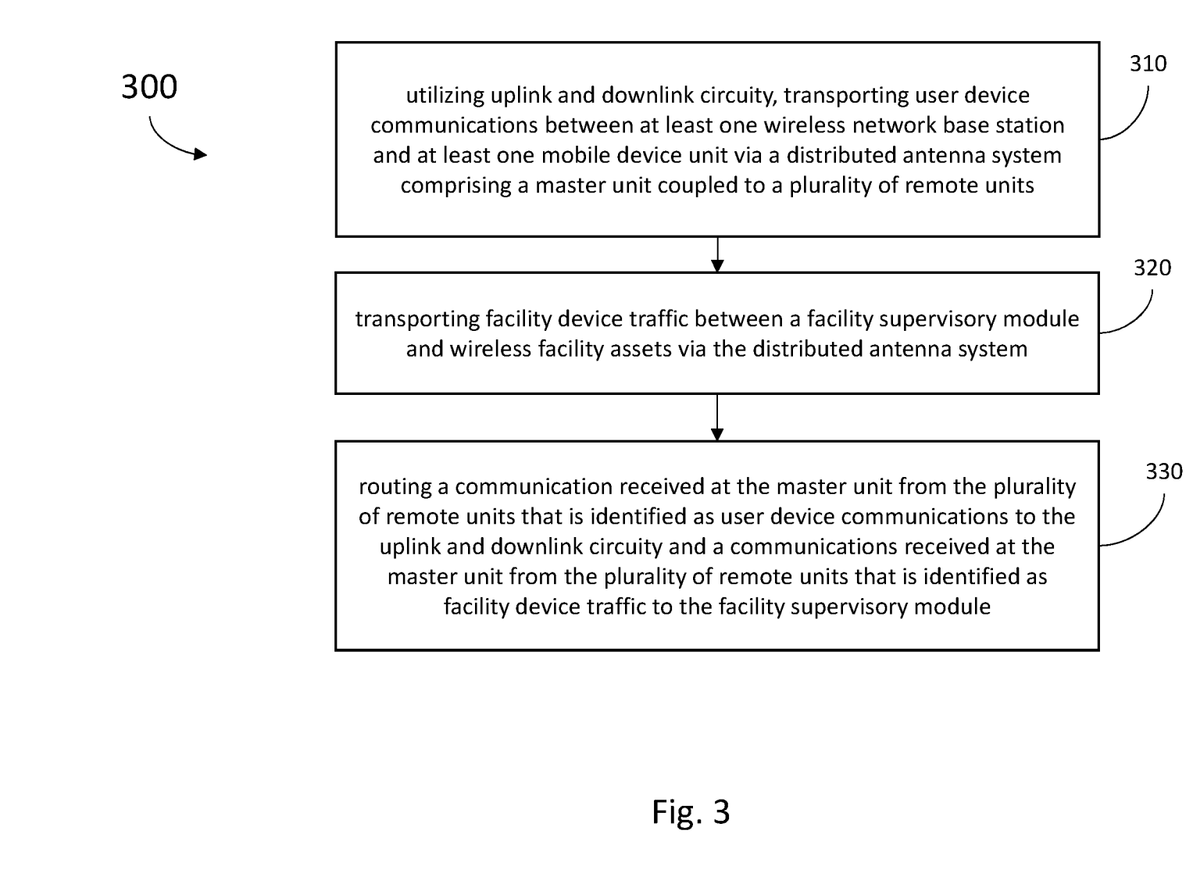
FIG. 3 is a flow chart illustrating one embodiment of a method for a unified facility communication system.

FIG. 3 is a flow chart illustrating one embodiment of a method for a unified facility communication system. It should be understood that the features and elements described herein with respect to the method 300 shown in FIG. 3 and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIG. 3 may apply to like named or described elements for any of the other figures and embodiments and vice versa.

The method begins at 310 with utilizing uplink and downlink circuitry, transporting user device communications between at least one wireless network base station and at least one mobile device unit via a distributed antenna system comprising a master unit coupled to a plurality of remote units. In some embodiments, the distributed antenna system may further comprise extension and expansion units such as the DAS 200 in FIG. 2. The method proceeds to 320 with transporting facility device traffic between a facility supervisory module and wireless facility assets via the distributed antenna system. In some embodiments, device IDs for known installed facility asset devices can be utilized to readily identify traffic associated with facility asset devices. In some embodiments separate channels of the distributed antenna system may be used to carry traffic identified as facility device traffic from traffic identified as user device traffic. The method proceeds to 330 with routing a communication received at the master unit from the plurality of remote units that is identified as user device communications to the uplink and downlink circuitry and a communications received at the master unit from the plurality of remote units that is identified as facility device traffic to the facility supervisory module.

EXAMPLE EMBODIMENTS

Example 1 includes a facility communications system, the system comprising: a master unit; and a plurality of remote antenna units coupled to the master unit, the master unit and the plurality of remote antenna units defining a distributed antenna system; wherein the master unit is configured to communicatively couple to at least one wireless network base station, wherein the master unit is configured to receive a base station downlink radio frequency signal and to transmit a base station uplink radio frequency signal; wherein the remote antenna units are each configured to radiate a remote downlink radio frequency signal into a coverage area within a facility, the remote antenna unit further configured to receive a remote uplink radio frequency signal from the coverage area; wherein the master unit comprises uplink and downlink circuitry configured to transport user device communications between the at least one wireless network base station and at least one mobile device unit in the coverage area via the plurality of remote antenna units; wherein the master unit comprises a facility supervisory module, wherein the facility supervisory module is configured to process facility device communications associated with a plurality of wireless facility assets in the coverage area, wherein the facility device communications are transported via the plurality of remote antenna units.

Example 2 includes the system of example 1, wherein the facility device communications comprises sensor measurement data generated by the plurality of wireless facility assets, equipment control commands transmitted to the plurality of wireless facility assets, or both.

Example 3 includes the system of any of examples 1-2, wherein the master unit comprises a wired network interface configured to communicate with a wired network, wherein the facility supervisory module communicates the facility device communications with at least one wire network asset vie the wired network.

Example 4 includes the system of any of examples 1-3, wherein the plurality of wireless facility assets comprise at least one of: a smoke detector, a heat detector, a flame detector, a poisonous gas detector, an airborne particulate detector, a radiation detector, a motion detector, or a proximity detector, a vehicle or a robot.

Example 5 includes the system of any of examples 1-4, wherein the facility supervisory module actuates one or more alarms within the facility based on measurement data received from the plurality of wireless facility assets.

Example 6 includes the system of any of examples 1-5, wherein the facility supervisory module is configured to transmit information to the at least one mobile device unit in response to the facility device communications received from the at least one wireless facility asset.

Example 7 includes the system of any of examples 1-6, wherein the facility supervisory module is configured to store a location of the at least one mobile device unit based on which of the plurality of remote antenna units the at least one mobile device unit is communicating with.

Example 8 includes the system of example 7, wherein the facility supervisory module is configured to store a location of the at least one wireless facility asset.

Example 9 includes the system of any of examples 7-8, wherein the facility supervisory module is configured to store the location of the at least one wireless facility asset based on which of the plurality of remote antenna units the at least one wireless facility asset is communicating with.

Example 10 includes the system of any of examples 1-9, wherein the facility supervisory module is configured to transmit a floor plan for the facility to the at least one mobile device unit based on which of the plurality of remote antenna units the at least one mobile device unit is communicating.

Example 11 includes the system of example 10, wherein the facility supervisory module is configured to display overlay information on the floor plan based on facility device communications received from the wireless facility asset.

Example 12 includes the system of any of examples 1-11, wherein the facility supervisory module is configured to display an escape route on the at least one mobile device unit based on facility device communications received from the wireless facility asset.

Example 13 includes the system of any of examples 1-12, wherein the facility supervisory module is configured to determine a proximity of a first mobile device unit to a first wireless facility asset and transmit information derived from the facility device communications based on the determine proximity.

Example 14 includes the system of any of examples 1-13, wherein the facility supervisory module is configured to present a graphical representation of a relative position of the at least one mobile device unit and the at least one wireless facility asset.

Example 15 includes the system of any of examples 1-14, wherein the facility supervisory module is configured to transmit data to first responder equipment based on at least one of, a location of the at least one mobile device unit, a location of the at least one wireless facility asset, and sensor measurement data received from the at least one wireless facility asset.

Example 16 includes a unit for use with a digital antenna system comprising a master unit coupled to a plurality of remote units within a facility, unit comprising: uplink circuitry and downlink circuitry, the uplink circuitry and downlink circuitry configured to transport user device communications between the at least one wireless network base station and at least one mobile user device unit in a coverage area of the digital antenna system; a facility communications decoder configured to extract facility device communications transported between the master unit and at least one wireless facility asset in the coverage area of the digital antenna system; and a facility supervisory module coupled to the facility communications decoder; wherein the user device communications are communicated with the at least one mobile user device via the plurality of remote units and the facility device communications are communicated with the at least one wireless facility via the plurality of remote units; and wherein the facility supervisory module is configured to process the facility device communications to determine a condition of the facility, wherein the facility device communications comprises sensor measurement data generated by the plurality of wireless facility assets, equipment control commands transmitted to the plurality of wireless facility assets, or both.

Example 17 includes the unit of example 16, further comprising a controller, wherein the facility communications decoder and the facility supervisory module are executed by the controller.

Example 18 includes the unit of any of examples 16-17, wherein the facility supervisory module is configured to transmit information to either a supervisory panel, the at least one mobile device unit, or both, in response to the facility device communications received from the at least one wireless facility asset.

Example 19 includes the unit of any of examples 16-18, wherein the facility supervisory module is configured to determine a location of the at least one mobile device unit based on which of the plurality of remote antenna units the at least one mobile device unit is communicating with.

Example 20 includes the unit of any of examples 16-19, the unit further comprising a floor plan database; wherein the facility supervisory module is configured to transmit a floor plan for the facility to the at least one mobile device unit based on facility device communications received from the wireless facility asset.

Example 21 includes the unit of example 20, wherein the facility supervisory module is configured to display overlay information on the floor plan based on facility device communications received from the wireless facility asset.

Example 22 includes the unit of any of examples 16-21, wherein the facility supervisory module is configured to display an escape route on the at least one mobile device unit based on facility device communications received from the wireless facility asset.

Example 23 includes the unit of any of examples 16-22, wherein the facility supervisory module is configured to determine a proximity of a first mobile device unit to a first wireless facility asset and transmit information derived from the facility device communications based on the determine proximity.

Example 24 includes the unit of any of examples 16-23, wherein the facility supervisory module is configured to present a graphical representation of a relative position of the at least one mobile device unit and the at least one wireless facility asset.

Example 25 includes the unit of any of examples 16-24, wherein the facility supervisory module is configured to transmit data to first responder equipment based on at least one of, a location of the at least one mobile device unit, a location of the at least one wireless facility asset, and sensor measurement data received from the at least one wireless facility asset.

In various alternative embodiments, system and/or device elements in example implementations described throughout this disclosure (such as any of the mobile user devices, wires and wireless facility assets, sensors, actuators, responder equipment, supervisory panels and portals, facility supervisory units, wireless access points, master units, remote antenna units, expansion and extension units, facility supervisory modules, facility communications decoders, controllers, interfaces, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High-Speed Integrated Circuit (VHSIC) Hardware Description Language (VHDL).

As used herein, terms such as "controller", "remote antenna unit", "master unit", "access point", "facility supervisory module", "decoder", "interface", "mobile user device", "facility asset" or "circuitry", each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A facility communications system, the system comprising:
   a master unit; and
   a plurality of remote antenna units coupled to the master unit, the master unit and the plurality of remote antenna units defining a distributed antenna system;
   wherein the master unit is configured to communicatively couple to at least one wireless network base station, wherein the master unit is configured to receive a base station downlink radio frequency signal and to transmit a base station uplink radio frequency signal;
   wherein the plurality of remote antenna units are each configured to radiate a remote downlink radio frequency signal into a coverage area within a facility, the plurality of remote antenna unit further configured to receive a remote uplink radio frequency signal from the coverage area;
   wherein the master unit comprises uplink and downlink circuitry configured to transport user device communications between the at least one wireless network base station and at least one mobile device unit in the coverage area via the plurality of remote antenna units;
   wherein the master unit comprises a facility supervisory module, configured to process facility device traffic associated with a plurality of wireless facility assets in the coverage area, wherein the facility device traffic is transported via the plurality of remote antenna units;
   wherein within the master unit, user device communications are routed via the uplink and downlink circuitry and facility device traffic is routed via the facility supervisory module;
   wherein the facility supervisory module is configured to transmit information to the at least one mobile device unit in response to the facility device traffic received from at least one wireless facility asset of the plurality of wireless facility assets;
   wherein the information transmitted to the at least one mobile device unit is based on a correlation by the facility supervisory module of a location of the at least one mobile device unit and a location of the at least one wireless facility asset of the plurality of wireless facility assets.

2. The system of claim 1, wherein the facility device traffic comprises one or both of:
   sensor measurement data generated by the plurality of wireless facility assets; or
   equipment control commands transmitted to the plurality of wireless facility assets.

3. The system of claim 1, wherein the master unit comprises a wired network interface configured to communicate with a wired network, wherein the facility supervisory module communicates the facility device traffic with at least one wire network asset vie the wired network.

4. The system of claim 1, wherein the plurality of wireless facility assets comprise at least one of:
   a smoke detector, a heat detector, a flame detector, a poisonous gas detector, an airborne particulate detector, a radiation detector, a motion detector, or a proximity detector, a vehicle or a robot.

5. The system of claim 1, wherein the facility supervisory module actuates one or more alarms within the facility based on measurement data received from the plurality of wireless facility assets.

6. The system of claim 1, wherein the facility supervisory module is configured to store the location of the at least one mobile device unit based on which of the plurality of remote antenna units the at least one mobile device unit is communicating with.

7. The system of claim 6, wherein the facility supervisory module is configured to store one or both of:
the location of the at least one wireless facility asset; or
the location of the at least one wireless facility asset based on which of the plurality of remote antenna units the at least one wireless facility asset is communicating with.

8. The system of claim 1, wherein the facility supervisory module is configured to transmit a floor plan for the facility to the at least one mobile device unit based on which of the plurality of remote antenna units the at least one mobile device unit is communicating;
wherein the facility supervisory module is configured to display overlay information on the floor plan based on facility device traffic received from the at least one wireless facility asset.

9. The system of claim 1, wherein the facility supervisory module is configured to display an escape route on the at least one mobile device unit based on facility device traffic received from the at least one wireless facility asset.

10. The system of claim 1, wherein the facility supervisory module is configured to determine a proximity of a first mobile device unit to a first wireless facility asset and transmit information derived from the facility device traffic based on the determined proximity.

11. The system of claim 1, wherein the facility supervisory module is configured to present a graphical representation of a relative position of the at least one mobile device unit and the at least one wireless facility asset.

12. The system of claim 1, wherein the facility supervisory module is configured to transmit data to first responder equipment based on at least one of, the location of the at least one mobile device unit, the location of the at least one wireless facility asset, and sensor measurement data received from the at least one wireless facility asset.

13. A unit for use with a digital antenna system comprising a master unit coupled to a plurality of remote units within a facility, the unit comprising:
uplink circuitry and downlink circuitry, the uplink circuitry and downlink circuitry configured to transport user device communications between at least one wireless network base station and at least one mobile device unit in a coverage area of the digital antenna system;
a facility communications decoder configured to extract facility device traffic transported between the master unit and at least one wireless facility asset of a plurality of wireless facility assets in the coverage area of the digital antenna system; and
a facility supervisory module coupled to the facility communications decoder;
wherein the user device communications are communicated with the at least one mobile device unit via the plurality of remote units and the facility device traffic are communicated with the at least one wireless facility asset via the plurality of remote units; and
wherein the facility supervisory module is configured to process the facility device traffic to determine a condition of the facility, wherein the facility device traffic comprises sensor measurement data generated by the plurality of wireless facility assets, equipment control commands transmitted to the plurality of wireless facility assets, or both;
wherein the facility supervisory module is configured to transmit information to the at least one mobile device unit in response to the facility device traffic received from the at least one wireless facility asset;
wherein the information transmitted to the at least one mobile device unit is based on a correlation by the facility supervisory module of a location of the at least one mobile device unit and a location of the at least one wireless facility asset of the plurality of wireless facility assets.

14. The unit of claim 13, further comprising a controller, wherein the facility communications decoder and the facility supervisory module are executed by the controller.

15. The unit of claim 13, wherein the facility supervisory module is configured to transmit information to a supervisory panel in response to the facility device traffic received from the at least one wireless facility asset.

16. The unit of claim 13, wherein the facility supervisory module is configured to determine the location of the at least one mobile device unit based on which of the plurality of remote units the at least one mobile device unit is communicating with.

17. The unit of claim 13, the unit further comprising a floor plan database;
wherein the facility supervisory module is configured to transmit a floor plan for the facility to the at least one mobile device unit based on facility device traffic received from the at least one wireless facility asset;
wherein the facility supervisory module is configured to display overlay information on the floor plan based on facility device traffic received from the at least one wireless facility asset.

18. The unit of claim 13, wherein the facility supervisory module is configured to display an escape route on the at least one mobile device unit based on facility device traffic received from the at least one wireless facility asset.

19. The unit of claim 13, wherein the facility supervisory module is configured to determine a proximity of a first mobile device unit to a first wireless facility asset and transmit information derived from the facility device traffic based on the determined proximity.

20. The unit of claim 13, wherein the facility supervisory module is configured to present a graphical representation of a relative position of the at least one mobile device unit and the at least one wireless facility asset.

21. The unit of claim 13, wherein the facility supervisory module is configured to transmit data to first responder equipment based on at least one of, the location of the at least one mobile device unit, the location of the at least one wireless facility asset, and sensor measurement data received from the at least one wireless facility asset.

22. A method comprising:
utilizing uplink and downlink circuitry, transporting user device communications between at least one wireless network base station and at least one mobile device unit via a distributed antenna system comprising a master unit coupled to a plurality of remote units; and
transporting facility device traffic between a facility supervisory module and wireless facility assets via the distributed antenna system;
routing a communication received at the master unit from the plurality of remote units that is identified as user device communications to the uplink and downlink circuitry and a communication received at the master unit from the plurality of remote units that is identified as facility device traffic to the facility supervisory module;
transmitting information from the facility supervisory module to the at least one mobile device unit in response to the facility device traffic received from at least one wireless facility asset of the wireless facility assets;

wherein the information transmitted to the at least one mobile device unit is based on a correlation by the facility supervisory module of a location of the at least one mobile device unit and a location of the at least one wireless facility asset of the wireless facility assets.

23. The method of claim 22, further comprising:

sending the identified facility device traffic to the facility supervisory module via the distributed antenna system on a first channel separate from a second channel used to transport user device traffic to the utilizing uplink and downlink circuitry.

24. The method of claim 22, further comprising:

utilizing the facility supervisory module, obtaining a present location of a first wireless facility asset based on remote unit location information stored in a facility asset database and in response to the facility device traffic; and displaying information based on measurement data from the first wireless facility asset and the present location of the first wireless facility asset.

25. The method of claim 24, further comprising:

displaying a floorplan retrieved by the facility supervisory module from a floor plan database in response to the measurement data; and displaying a relative position of a first mobile device unit with respect to the first wireless facility asset on the displayed floorplan.

* * * * *

UNITED STATES PATENT AND TRADEMARK OFFICE
CERTIFICATE OF CORRECTION

PATENT NO. : 11,272,500 B2
APPLICATION NO. : 16/572963
DATED : March 8, 2022
INVENTOR(S) : Stefanik et al.

It is certified that error appears in the above-identified patent and that said Letters Patent is hereby corrected as shown below:

In the Claims

At Column 18, Line 16: Please replace "remote antenna unit" with --remote antenna units--

Signed and Sealed this
Thirteenth Day of June, 2023

Katherine Kelly Vidal
*Director of the United States Patent and Trademark Office*